United States Patent [19]
Lundin et al.

[11] Patent Number: 5,845,038
[45] Date of Patent: Dec. 1, 1998

[54] OPTICAL FIBER ILLUMINATION SYSTEM

[75] Inventors: David Jon Lundin, Woodbury, Minn.; Michael C. Lea, Harlow, England

[73] Assignee: Minnesota Mining and Manufacturing Company

[21] Appl. No.: 789,808

[22] Filed: Jan. 28, 1997

[51] Int. Cl.⁶ .................................................. G02B 6/26
[52] U.S. Cl. ............................................. 385/901; 362/32
[58] Field of Search ........................... 385/901, 31, 146, 385/47; 362/32

[56] References Cited

U.S. PATENT DOCUMENTS

| | | | |
|---|---|---|---|
| 4,171,844 | 10/1979 | Landaal et al. | 296/57 |
| 4,885,663 | 12/1989 | Parker | 362/32 |
| 4,907,132 | 3/1990 | Parker | 362/32 |
| 5,021,928 | 6/1991 | Daniel | 362/32 |
| 5,363,470 | 11/1994 | Wortman | 385/147 |
| 5,432,876 | 7/1995 | Appeldorn et al. | 385/31 |
| 5,659,643 | 8/1997 | Appeldorn et al. | 385/901 |

FOREIGN PATENT DOCUMENTS

| | | |
|---|---|---|
| 38 01 385 A1 | 7/1989 | Germany . |
| 62-9205 | 5/1985 | Japan . |
| 62-9206 | 7/1985 | Japan . |
| 63-253903 | 4/1987 | Japan . |
| 62-088433 | 10/1987 | Japan . |
| 2 214 326 | 1/1989 | United Kingdom . |

OTHER PUBLICATIONS

Mary Poppendieck and David Brown, "Control of Light Output from Plastic Optical Fiber with Optical Elements", undated.

*Primary Examiner*—Hung N. Ngo
*Attorney, Agent, or Firm*—Stephen W. Buckingham

[57] ABSTRACT

An illumination system comprises a light source optically coupled with an optical fiber. The optical fiber includes a light emitting region extending along a portion of its length. The light emitting region includes a plurality of optical elements disposed about a first longitudinal axis extending along the surface of the optical fiber and a plurality of optical elements disposed about a second longitudinal axis extending along the surface of the fiber. The second longitudinal axis is displaced from the first longitudinal axis. In use, light from the light source is injected into the optical fiber and propagates along the fiber according to Snell's law. A portion of the light propagating through the fiber becomes is reflected from the optical elements and is extracted from the fiber.

23 Claims, 3 Drawing Sheets

OPTICAL FIBER ILLUMINATION SYSTEM

FIELD OF THE INVENTION

The present invention relates to illumination systems that employ optical fibers as a light transporting mechanism. In particular, the present invention relates to illumination systems that employ light guides for transporting and distributing light energy.

BACKGROUND

It is known that optically transmissive materials such as glass or polymers may be used as a light guide to propagate light. A light guide typically includes at least one surface adapted to receive light from a light source and an optically smooth surface for reflecting light propagating through the light guide. Common examples of light guides include optical fibers traditionally used in the data communications industry and more recently used for illumination purposes (See e.g. U.S. Pat. No. 5,432,876). At least one end surface of the optical fiber is adapted to receive light from a light source which propagates axially through the fiber. Planar waveguides used in the optical display industry are another example of optical waveguides. At least one end surface of the planar waveguide is adapted to receive light from a light source. Light injected into the waveguide propagates between the two major surfaces of the waveguide.

It is also known that optical fiber may be used as a component of an illumination system. Light may be injected into one end of an optical fiber and allowed to exit the fiber at a predetermined position along the fiber. Techniques for encouraging light to exit the fiber include subjecting the fiber to relatively sharp bends, generally known as microbends (U.S. Pat. Nos. 4,171,844; 4,885,663; 4,907,132; German Patent No. 3801385) and removing and/or roughening a portion of the optical fiber core or cladding to provide a diffuse surface which allows light to escape (French Pat. No. 2626381; Japanese Utility Model Registration Nos. 62-9205; 62-9206). Each of these techniques are essentially passive extraction techniques which allow light to leak from an optical fiber in an uncontrolled fashion.

U.S. Pat. No. 5,432,876 (the U.S. Pat. No. '876) is directed toward an optical fiber having a plurality of reflecting surfaces formed in the core of the optical fiber which reflect, in a radial direction, a portion of the light propagating axially through the fiber. U.S. Ser. No. 08/518,337, co-pending and commonly assigned herewith, is directed toward an illumination system wherein a light extraction overlay having a plurality of reflecting surfaces is optically coupled with an optical fiber to extract light from the fiber. In contrast to previous passive light extraction techniques, these systems actively reflect light from the fiber.

In any given optical fiber illumination application it is desirable to control at least two variables. The first variable is the rate at which optical power is extracted from the optical fiber. In a system that utilizes reflective surfaces to extract light from the waveguide, the rate of optical power extraction per unit length of optical fiber is a function of the total cross-sectional area of optical element reflecting surfaces per unit length to the cross-sectional area of the fiber over the unit length. The greater the total cross-sectional area of reflecting surfaces in a given length of optical fiber, the greater the rate of optical power extraction from the fiber, assuming a constant optical fiber diameter over the length. Increasing the depth to which optical elements extend into an optical fiber or decreasing the distance between adjacent elements results in an increased rate of optical power extraction from an optical fiber.

It is also desirable to control the directional distribution of light energy extracted from an optical fiber. Light extracted from an optical fiber in accordance with the invention described in the U.S. Pat. No. '876 exits the fiber with an emerging angular distribution. It is desirable to control the angular spread of light energy in both the longitudinal (e.g. down-fiber) direction and the lateral (e.g. cross-fiber) direction. The longitudinal (e.g. down-fiber) distribution of light energy in the emerging angular distribution is primarily a function of the cone angle of light propagating through the optical fiber. The lateral (e.g. cross-fiber) distribution of light energy in the emerging angular distribution is primarily a function of the angle circumscribed by the reflecting surfaces of the optical elements. For optical elements having flat bases, the angle circumscribed by the reflecting surfaces of the optical elements is a function of depth the reflecting surface extends into the optical fiber core. Thus, increasing the depth to which an optical element extends into an optical fiber has the corollary effect of increasing the lateral (e.g. cross-fiber) distribution of light energy in the emerging angular distribution and thus the amount of optical power extracted from the fiber by the element.

The correlation between the lateral distribution of the divergence cone of reflected light and the power of extracted light imposes limitations on the design of optical illumination systems. For example, in some applications it may be desirable to broaden the lateral distribution of light energy in the divergence cone of light extracted from the fiber without dramatically affecting the longitudinal distribution of light energy or the rate of power extraction from the fiber.

It is also desirable to control the spatial intensity of light energy within the emerging angular distribution of light energy. In illumination systems that include a plurality of optical elements spaced closely adjacent one another along the axis of propagation to reflect light from the waveguide each optical element blocks a portion of the light that would otherwise be incident on the subsequent element. For the purposes of this application, this phenomena shall be referred to as 'shadowing'. Shadowing introduces variability into the spatial intensity of light energy in the emerging angular distribution of light reflected from a waveguide. In some designs the shadowing effect is sufficiently severe to generate dark spots, also called voids or holes, in the angular distribution of light energy reflected from a waveguide. The variability in the angular distribution of light energy introduced by shadowing effects is generally considered undesirable. This variability is particularly undesirable for applications in which the waveguide is used as a light source for direct viewing such as, for example, as a warning light on a motor vehicle.

Thus, there is a need in the art for an optical waveguide in which the lateral distribution of light energy in the emerging angular distribution may be controlled independent of the longitudinal distribution of light energy, and thus the rate of power extraction. There is also a need in the art for an optical waveguide that compensates for shadowing effects caused by closely spaced optical elements.

SUMMARY OF THE INVENTION

The present invention addresses these and other issues by providing an illumination system that includes an optical fiber having an optically smooth surface for propagating light through the fiber and a light emitting region that extends along a portion of the fiber. The light emitting region includes at least one, and preferably a plurality, of optical elements centered about a first longitudinal axis extending along the optically smooth surface of the optical fiber. The light emitting region further includes at least one, and preferably a plurality, of optical elements centered about a second longitudinal axis extending along the optically smooth surface of the optical fiber. The second longitudinal axis is angularly displaced from the first longitudinal axis.

In another embodiment, the invention provides an optical waveguide adapted to reduce visible variations the angular intensity of light reflected from the waveguide in a viewing region centered about an axis disposed at a desired viewing angle, γ. The waveguide comprises a core formed from a substantially optically transparent material having a first surface adapted for receiving light from a light source and at least one optically smooth surface for propagating light through the waveguide along an axis of propagation. The optical surface comprises a plurality of optical elements, each optical elements having at least one optically reflective surface disposed at an oblique angle θ to a plane perpendicular to the axis of propagation; the angle θ being determined by the equation:

$$\frac{90 + \gamma'}{2} + \xi$$

wherein ξ is selected from the group of angles extending from (α/2) to (β/2) or (−β/2) to (−α) and wherein α=the shadowing angle β=the cone angle of light propagating through the optical fiber; and γ'=the desired exit angle of reflected light.

DETAILED DESCRIPTION

The present invention is directed toward providing light guides which are capable of emitting light and that find particular utility in the construction of illumination systems. In describing the invention, specific embodiments and terminology will be used for the sake of clarity. The invention, however, is not intended to be limited to the specifically described embodiments and terms. In particular, the present invention will be explained with reference to a optical fiber light guide having that is generally circular in cross-section. However, one of ordinary skill in the art will recognize that principles of the present invention apply optical fibers of different cross-sectional shapes and to planar waveguides.

Figure 1:
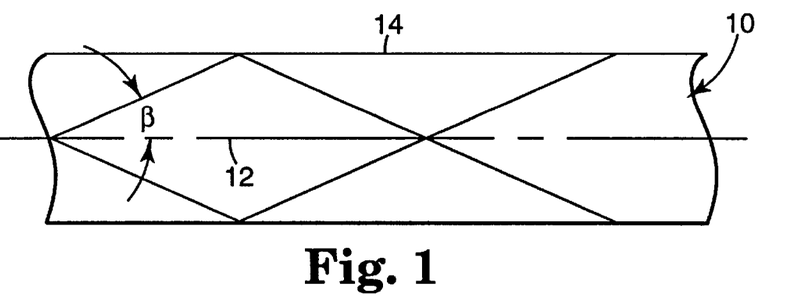
FIG. 1 is a cross-sectional view of an optical fiber illustrating the propagation of light through the fiber.

By way of background, referring to FIG. 1, light injected into an optical fiber 10 propagates through fiber 10 along an axis of propagation 12 substantially coincident with the longitudinal axis of fiber 10. The light propagates through the fiber with a maximum cone angle, β, measured from the axis of propagation 12 that is determined by the critical angle necessary for total internal reflection. The angle β may be derived by first calculating the critical angle (θc) required for total internal reflection from Snell's law as follows:

$$\sin\theta_c = \left(\frac{n_2}{n_1}\right)$$

where $\eta_1$ is the refractive index of the optical fiber core material and $\eta_2$ is the refractive index of the surrounding medium, typically a cladding material or air. The cone angle β is the complement of the critical angle $\theta_c$. Thus, light propagates through optical fiber 10 in a cone angle β that is proportional to the ratio of the refractive index of the core material to the refractive index of the medium surrounding the core.

According to one aspect of the present invention an optical fiber is provided with reflective elements for extracting light from the fiber in a manner that broadens the lateral (e.g. cross-fiber) distribution of light energy extracted from the fiber without substantially affecting the longitudinal (e.g. down-fiber) distribution of light energy extracted from the fiber. In a preferred embodiment there is provided an optical fiber including an optical fiber core having an optically smooth surface for propagating light through the fiber and a light emitting region along at least a portion of its length, the light emitting region preferably includes a plurality of optical elements centered about a first longitudinal axis extending along the optically smooth surface of the optical fiber core and a plurality of optical elements centered about a second longitudinal axis along the optically smooth surface of the optical fiber core. Each optical element includes at least one optically reflective surface extending into the optical fiber core such that a portion of the light striking the optical element is reflected out of the optical fiber.

Figure 2:
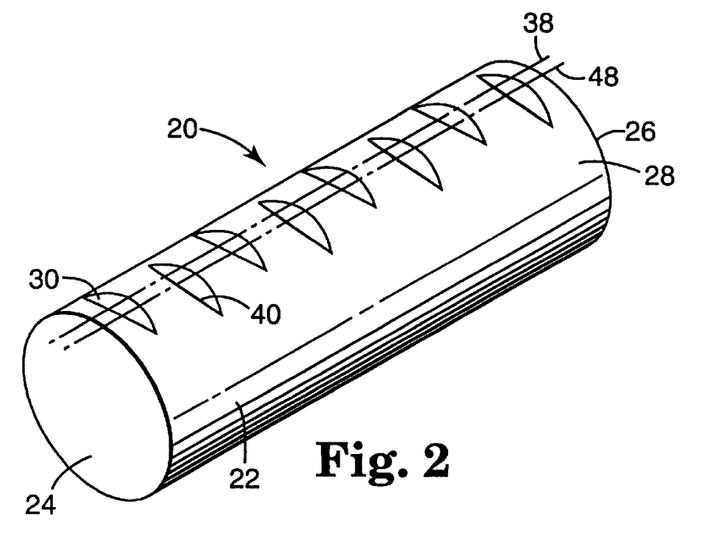
FIG. 2 is a perspective view of a segment of an optical fiber in accordance with aspects of the present invention.
Figure 3:
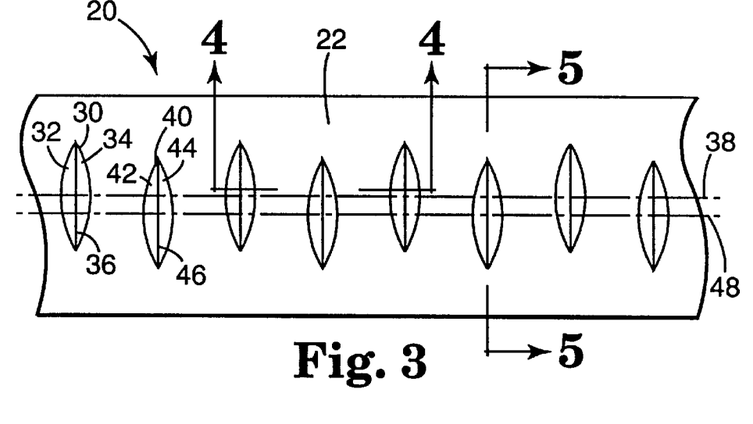
FIG. 3 is a plan view of the optical surface of the optical fiber depicted in FIG. 2.

A preferred embodiment of an optical waveguide according to the present invention is set forth in FIGS. 2–6. FIG. 2 is a perspective view of a portion of an optical fiber 20 in accordance with aspects of the present invention and FIG. 3 is a plan view of a portion thereof. Optical fiber 20 includes an optical fiber core 22 having a first end surface 24, a second end surface 26, and an optically smooth surface 28 extending longitudinally along the length of fiber 20. Preferably, optically smooth surface 28 corresponds to the circumferential surface of optical fiber core 22. As used herein, the term optically smooth surface shall refer to a surface that is capable of reflecting light incident on the surface with minimal scattering or diffusion such as is possible when the surface roughness is small in comparison to the wavelength of light. Although the fiber depicted in FIG. 2 is a 'naked' fiber, it will be appreciated by one of ordinary skill in the optical arts that the fiber may include a cladding layer(s) and/or additional jacketing layers.

Optical fiber 20 is provided with a plurality of optical elements 30 centered about a first longitudinal axis 38 extending along the optically reflective surface 28 of optical fiber 20 and a plurality of optical elements 40 centered about a second longitudinal axis 48 of optical fiber 20. According to one aspect of the present invention, first longitudinal axis 38 is displaced from second longitudinal axis 48. For most optical fibers, it is convenient to measure the angular displacement δ (FIG. 5) between first longitudinal axis 38 and second longitudinal axis 48. However, the displacement between the two longitudinal axes may also be measured as a distance along the reflective surface 28 of optical fiber 20. A distance measurement may be appropriate for optical fibers having polygonal cross-sectional shapes.

Figure 4:
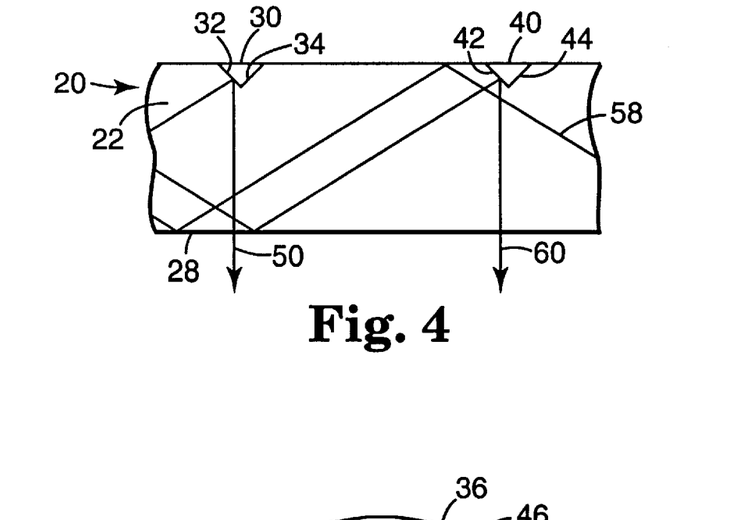
FIG. 4 is a cross-sectional view, taken along a longitudinal axis, of a portion of an optical fiber depicted in FIG. 2.

Referring to FIGS. 3 and 4, optical fiber 20 is provided with a plurality of optical elements 30 centered about a first longitudinal axis 38 along optically reflective surface 28 of fiber 20. Preferably, each optical element 30 includes a first optically reflective surface 32 that extends into the core 22 of optical fiber 20. Optically reflective surface 32 is preferably a substantially optically smooth surface, meaning that it is capable of reflecting light with minimal losses due to scattering or diffusion. Surface 32 may be disposed at any useful angle between 0° and 90° from an axis perpendicular to the axis of propagation. Each optical element 30 also includes a second surface 34 which may or may not be optically reflective. Surfaces 32 and 34 intersect to define the base 36 of optical element 30. Optical fiber 20 is further provided with a plurality of optical elements 40 centered about a second longitudinal axis 48 along the optically reflective surface of fiber 20. Preferably, each optical element 40 includes a first optically reflective surface 42 that extends into the core 22 of optical fiber 20. Optically reflective surface 42 is also preferably a substantially optically smooth surface, meaning that it is capable of reflecting light with minimal losses due to scattering or diffusion. Surface 42 may be disposed at any useful angle between 0° and 90° from an axis perpendicular to the axis of propagation. Each optical element 40 also includes a second surface 44 which may or may not be optically reflective. Surfaces 42 and 44 intersect to define the base 46 of optical element 40.

Figure 5:
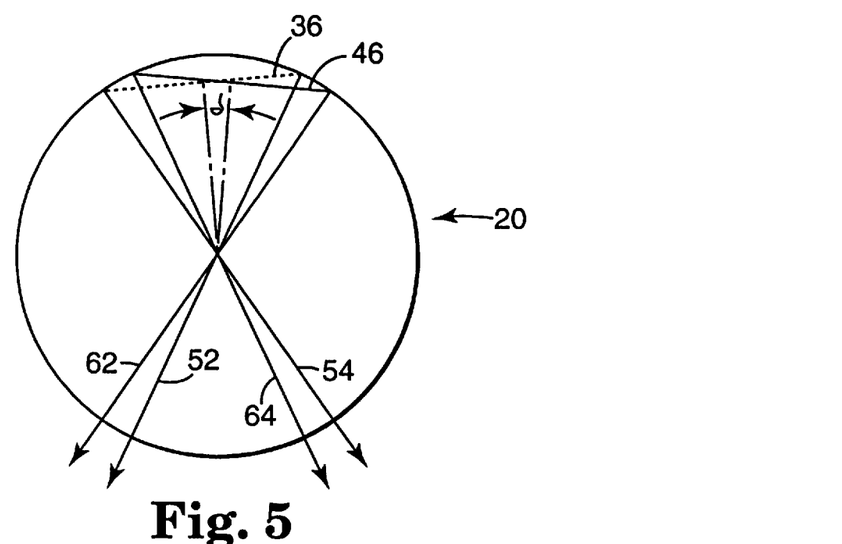
FIG. 5 is a cross-sectional view, taken perpendicular to a longitudinal axis, of a portion of the optical fiber depicted in FIG. 2.

Referring to FIGS. 4 and 5, in use, a first portion of the light propagating through optical fiber core 22, represented by light ray 50 becomes incident on an optically reflective surface 32 of optical element 30 and is reflected through optical fiber 20 such that it strikes the optically smooth surface 28 of optical fiber 20 at an angle greater than the critical angle required for continued propagation through the fiber and thus is at least partially refracted from optical fiber 20. A second portion of the light propagating through optical fiber 10, represented by light ray 58, strikes the optically reflective surface 28 of optical fiber 10 and continues to propagate through optical fiber 10. And a third portion of the light propagating through optical fiber core 22, represented by light ray 60 becomes incident on an optically reflective surface 42 of optical element 40 and is reflected through optical fiber 20 such that it strikes the optically smooth surface 28 of optical fiber 20 at an angle less than the critical angle required for continued propagation and thus is at least partially refracted from optical fiber 20.

FIG. 5 is a schematic, cross-sectional view, taken perpendicular to a longitudinal axis of optical fiber 20, that illustrates an aspect of the present invention. Dashed line 36 represents the bottom edge of an optical element 30, disposed about first longitudinal axis 38, while solid line 46 represents the bottom edge of an optical element 40, disposed about second longitudinal axis 48. Axes 38 and 48 are angularly displaced by an angle δ. Light rays 52 and 54 represent the limiting light rays reflected from optical fiber 20 by an optical element 30 disposed about first axis 38. Accordingly light reflected from optical element 30 emerges in a profile that extends through the included angle defined by light rays 52 and 54. Similarly, light rays 62 and 64 represent the limiting light rays reflected from optical fiber 20 by an optical element 40 disposed about second axis 48. Accordingly light reflected from optical element 40 emerges in a profile that extends through the included angle defined by light rays 62 and 64.

As FIG. 5 illustrates, the net effect of disposing optical elements about two distinct longitudinal axes is to broaden the lateral (e.g. cross-fiber) distribution of light energy in the divergence profile of light reflected from optical fiber 20. Advantageously, the lateral distribution of light energy is broadened without significantly affecting the divergence profile in the longitudinal (e.g. down-fiber) direction. Thus, the lateral distribution of light energy in the divergence profile may be controlled without substantially affecting of the longitudinal distribution of light energy in the divergence profile by disposing optical elements about two or more distinct longitudinal axes along the surface of the optical fiber. This may be accomplished using optical elements that have substantially flat (e.g. linear) groove bases (e.g. 36, 46) and which are substantially identical in size and geometry. These factors facilitate the design and manufacture of optical fiber illumination systems because the properties of such optical elements are easier to model than the properties of more complex optical elements. Additionally, optical elements having flat (e.g. linear) groove bases are easier to manufacture than optical elements having a more complex geometry.

It will be apparent to one of ordinary skill in the art that the minimum angular displacement δ is slightly greater than 0°, in which case the axes are nearly coincident, and the maximum angular displacement δ is 180°. In practice, the displacement δ between first longitudinal axis 20 and second longitudinal axis 22 is governed primarily by functional considerations. More particularly, the angular displacement δ is determined by the desired angular spread of the divergence cone of reflected light in the lateral (e.g. cross-fiber) dimension and may be determined using optical modeling techniques known to one of ordinary skill in the art. For many applications where the optical fiber is used to illuminate a broad area, angular displacements of up to 100° are useful to spread the emerging light into a broad angular distribution. By contrast, in applications where the optical fiber is viewed directly such as, for example, a vehicle warning light, it may be desirable to narrow the lateral dimension of the angular distribution of emerging light to concentrate the light within a desired angular range. For such applications, angular displacements δ between about 5° and 20° are useful.

Another benefit associated with disposing optical elements about distinct longitudinal axes extending along the surface of optical fiber 20 relates to shadowing effects in the fiber. Shadowing effects are discussed at length below. In brief, each optical element in an optical fiber shadows the adjacent optical element from a portion of the light rays propagating through optical fiber 20. The degree of shadowing is proportional to the depth to which the optical element extends into the optical fiber 20. Providing optical elements disposed about two distinct longitudinal axes on the surface of optical fiber 20 in accordance with the present invention reduces detrimental effects associated with shadowing by allowing light to be spread into a broader divergence cone without resorting to deeper optical elements as required in single axis embodiments. Additionally, because the optical elements are displaced from one another, shadowing effects are spread more evenly around the perimeter of optical fiber 20, making their effects less noticeable.

One of ordinary skill in the optical arts will appreciate that benefits of the present invention may be obtained with optical elements disposed about more than two longitudinal axes extending along the surface of optical fiber 20. For example, an optical fiber illumination system may incorporate optical elements disposed about three or more distinct longitudinal axes extending along the surface of optical fiber 20. The displacement between longitudinal axes may be predetermined to achieve a specific optical objective or, alternatively, may be random.

Reflective surfaces 32, 42 of optical elements 30, 40 respectively may be coated with a specularly reflective substance (e.g. silver, aluminum) such that light striking these surfaces is specularly reflected. However, if reflective surfaces 32, 42 are not coated with a specularly reflective substance, light incident on the reflective surface at an angle less than the critical angle defined by Snell's law will be transmitted (and refracted) through the optical element. By contrast, light incident on the reflective surface at an angle greater than the critical angle defined by Snell's law will be totally internally reflected, much like the light depicted by rays 58.

As discussed above, light extracted from an optical fiber by optical elements exits the fiber with an emerging angular distribution. The longitudinal (e.g. down-fiber) distribution of light energy in the divergence cone is primarily a function of the cone angle of light propagating through the optical fiber. This distribution may be adjusted providing the reflective faces of optical elements 10 with optical power, such as by introducing a curvature into these surfaces. Alternatively, the longitudinal distribution of light energy may be adjusted by altering the cone angle of light propagating through optical fiber 20. The lateral (e.g. cross-fiber) distribution of light energy in the divergence cone is a function of the depth to which the optical element reflecting surfaces extend into optical fiber 20. Thus, increasing the depth to which an optical element extends into optical fiber core increases the angular spread of light energy in the divergence cone.

Optical fiber 20 is preferably formed from a substantially optically transmissive material. Preferred materials exhibit high optical transmission and have relatively high refractive indices. Common materials include polymethylmethacrylate (refractive index 1.49) and polycarbonate (refractive index 1.58). Optionally, optical fiber 20 may include a cladding material (not shown) surrounding the core of the fiber. A cladding layer may comprise any suitable material known in the art having a refractive index appropriate for the chosen core material. Common optical fiber cladding materials include polyvinylidene fluoride (refractive index 1.42), perfluoroacrylate (refractive index 1.35) and polytetrafuloroethylene (refractive index 1.40), and tetrafluoroethylene-hexafluoropropylene-vinylidene fluoride, the refractive index of which varies with the relative concentration of its constituents, but may generally considered as approximately 1.36.

It will be appreciated that the morphology of each optical element 30, 40, for example: the angle of inclination of the first optically reflective surfaces 32, 42 and, to a lesser extent, the second surfaces 34, 44; whether the optically reflective surfaces 32, 42 is planar or curved; the cross-sectional area of each optically reflective surface 32, 42 etc., will influence the amount and direction of light emitted from the fiber 20 at that particular point. See, e.g. U.S. Pat. No. 5,432,876, the disclosure of which is incorporated by reference in its entirety. Consequently, the amount and direction of the light reflected from the fiber can be controlled by selecting the appropriate notch type, as well as the pattern and spacing of the notches along the fiber. Although each notch on a given fiber would ordinarily be of similar morphology, any useful combination of optical elements may be employed.

In the embodiment shown, the first optically reflective surface 24 of the optical element 18 is inclined at an angle of approximately 45° to an axis perpendicular to the axis of propagation, though angles of from 10° to 80°, preferably from 20° to 70° and more preferably from 30° to 60°, are also useful. Depending on the desired amount and direction of travel of the light exiting from the fiber, any useful angle from 0° to 90° may be used. Particularly preferred angular ranges for particular embodiments of an optical waveguide are set forth below.

The second optically reflective surfaces 34, 44 of the optical elements 30, 40 may be normal to the longitudinal axis of the fiber 20, or inclined to or away from a plane normal to the longitudinal axis of the fiber 20, to define 'V' shaped or undercut optical elements. Additionally, one or both optically reflective surfaces 34, 44 of the optical element 30, 40 may for certain uses be curved, but ordinarily they are substantially planar. The surfaces of the notch are normally fabricated so as to be of optical quality, meaning that the surfaces reflect incident light with minimal scattering or diffusion.

The term "optical element" is used herein to encompass any controlled interruption or discontinuity formed in the core of the optical fiber, which defines one or more surfaces capable of reflecting at least a portion of light impinging thereon through the opposing wall of the fiber. Such optical elements are to be distinguished from scratches and other interruptions, as well as imperfections and other surface irregularities, which occur from time to time in optical fibers because they are formed in a controlled manner, with the morphology, pattern and spacing of the elements being tailored to suit the intended use of the fiber. By appropriate control of the morphology of each optical element, e.g., the angle, curvature and cross-sectional area of the reflecting surface(s), as well as the pattern and spacing of the elements along the fiber, light can be selectively emitted through the side wall of the fiber.

Figure 6:
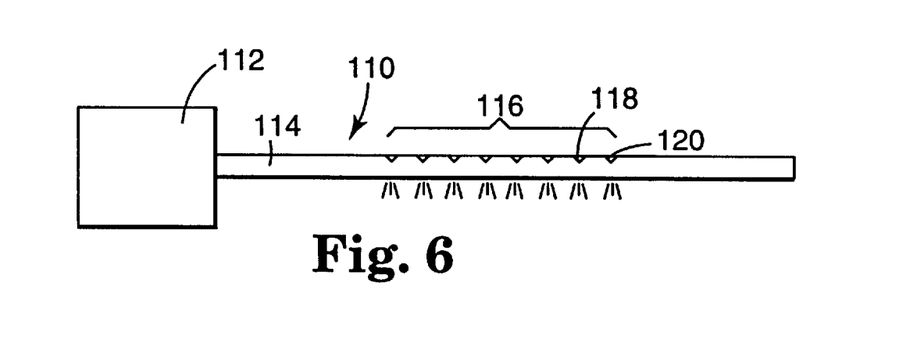
FIG. 6 is a schematic view of an optical fiber illumination system in accordance with aspects of the present invention.

FIG. 6 is a schematic depiction of an illumination system 110 in accordance with principles of the present invention. Illumination system 110 includes a light injection assembly 112 optically coupled with an optical fiber 114. Light injection assembly 112 includes a light source (not shown) and preferably includes a collimating assembly (not shown) for collimating light into a divergence cone which may be accepted by optical fiber 114. The particulars of light injection assembly 112 are not critical to the present invention. Suitable commercially available light injection assemblies include the Light Pump 150, commercially available from Remote Source Lighting International, Inc. of San Juan Capistrano, Calif., USA; and the Powerhouse™ Metal Halide Illuminator commercially available from Lumenyte International Corporation of Costa Mesa, Calif., USA Optical fiber 114 includes a light emitting region 116 extending along a portion of its length. Light emitting region 116 includes at least one optical element 118 disposed about a first longitudinal axis and a second optical element 120 disposed about a second longitudinal axis, as depicted in FIGS. 1–2. In use, light from the light source is injected into optical fiber 114 such that the light propagates through optical fiber 114 according to Snell's law. As discussed above, a portion of the light propagating through optical fiber 114 becomes incident on the reflective surfaces of optical elements 118, 120 and is reflected from the fiber. Illumination systems in accordance with the present invention may be used in a wide variety of applications including task lighting, vehicle lighting, conspicuity marking systems, and signing.

Another aspect of the present invention relates to controlling the impact of shadowing effects on the angular distribution of light energy reflected from an optical fiber. As discussed above, shadowing effects introduce variability into the angular distribution of light energy reflected from an optical fiber. Controlling shadowing effects is particularly useful for optical fibers having closely spaced optical elements. According to the invention, the angle the reflective surfaces form in the optical fiber may be modified to control shadowing effects in the fiber.

Figure 7:
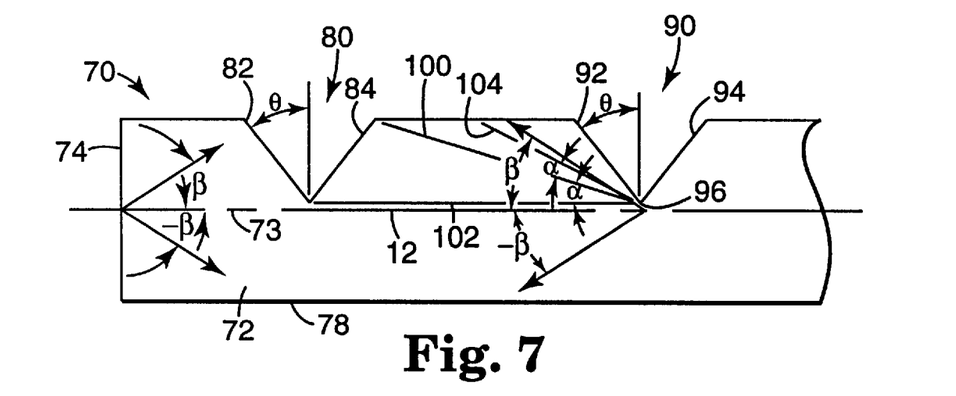
FIG. 7 is a cross-sectional view of an optical fiber illustrating shadowing effects in the fiber.
Figure 8:
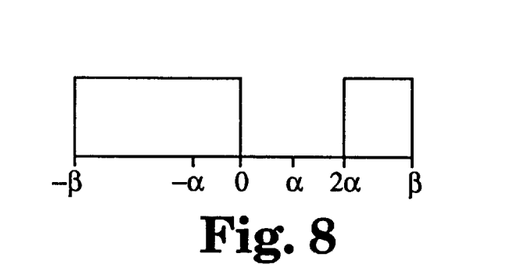
FIG. 8 is a graphical depiction of the angular distribution of light rays incident on a portion of a reflective surface in the optical fiber depicted in FIG. 6.
Figure 9:
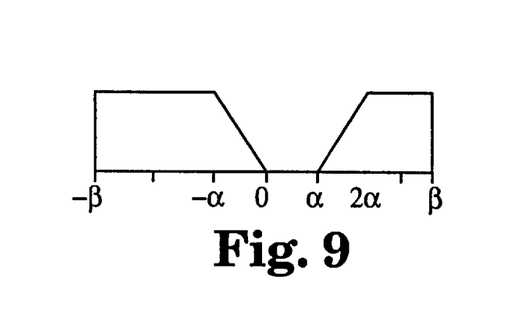
FIG. 9 is a graphical depiction of the angular distribution of light rays, similar to FIG. 8.

This aspect of the invention is best illustrated in FIGS. 7–9. Referring to FIG. 7, an optical fiber 70 includes a core 72 having a first surface 74 adapted to receive light from a light source (not shown) and an optically reflective surface 78 that reflects light propagating through optical fiber 70. Optically reflective surface 78 preferably corresponds to the circumferential surface of optical fiber core 72. A first optical element 80 is disposed at a first distance, $d_1$, from first surface 74 and a second optical element 90 is disposed at a second distance $d_2$, greater than $d_1$, from first surface 74. First optical element 80 includes a first optically reflective surface 82 disposed at an angle θ from an axis perpendicular to the longitudinal axis 73 of optical fiber 70 and a second surface 84. Second optical element 90 also includes a first optically reflective surface 92 disposed at an angle θ from an axis perpendicular to the longitudinal axis 73 of optical fiber 70 and a second surface 94.

As previously discussed in connection with FIG. 1, light injected into optical fiber 70 propagates through optical fiber 70 along an axis of propagation generally coincident with the longitudinal axis 73 of fiber 70 in a cone having a cone angle β determined by the relative refractive indices of the optical fiber core and the surrounding medium. For the present disclosure, it will be assumed that light propagates through optical fiber 70 from left to right. As a matter of convention, angular measurements taken above an axis parallel to the longitudinal axis 73 of optical fiber 70 will be considered positive, while angular measurements taken below an axis parallel to the axis of propagation will be considered negative.

When adjacent optical elements 80, 90 are spaced relatively closely (e.g. from 0.05 millimeters to 5.0 millimeters), first optical element 80 shadows a portion of the light that would otherwise be incident on reflective surface 92 of second optical element 90. The shadowing effect of first optical element 80 on second optical element 90 may be illustrated by comparing the angular distribution of light rays incident on reflective surface 82 of first optical element 80, which is not shadowed by an adjacent optical element, with the angular distribution of light rays incident on reflective surface 92 of second optical element 90, which is shadowed by first optical element.

Each point on reflective surface 82 of first optical element 80 receives light rays from the entire angular distribution (e.g. from −β to β) of light propagating through optical fiber 70. By contrast, the presence of first optical element 80 blocks a portion of the angular distribution of light incident propagating through optical fiber 70 from becoming incident on reflective surface 92 of second optical element 90.

FIG. 7 illustrates the shadowing effect of first optical element 80 at a point at the bottom edge 96 of reflective surface 92 of second optical element 90. Light propagates through optical fiber 70 with a cone angle of β. The shadowing angle α may be defined as the angle between a first optical path 100 extending from the bottom edge 96 of second optical element 90 to the top of first optical element 80 and a second optical path 102 extending from the same point on second optical element 90 to the bottom edge 86 of first optical element 80. All light rays within the angular range defined by shadowing angle α are blocked from becoming incident on the reflective surface 92 of second optical element 90 by first optical element 80. Additionally, optical path 104 represents the angle of the limiting light ray that passes the bottom edge 86 of first optical element 80, reflects from the surface 78 of optical fiber 70 and is incident on the bottom edge 96 of second optical element 90. Accordingly all light rays within the angular range between optical path 104 and 100 are also blocked by first optical element 80. Applying principles of geometric optics, it can be shown that the angle circumscribed by optical path 104 and optical path 100 is equal to the shadowing angle α. Thus, from the angular range of −β to β, light rays in the angular range extending from 0° (e.g. parallel to the axis of propagation) to 2α degrees are blocked, or shadowed, by optical element 80.

FIG. 8 presents a graphical depiction of the angular distribution of light rays incident on a point at the bottom edge 96 of reflective surface 92 of second optical element 90. Assuming a cone angle of β, (e.g. an angular distribution of light rays from −β to β, measured from the axis of propagation) the bottom edge 96 of reflective surface 92 of second optical element 90 receives light propagating in the angular ranges from −β to 0 degrees and from 2α to β degrees. However, light propagating in through the fiber in the angular distribution extending from 0 degrees to 2α degrees is shadowed by first optical element 80.

Thus, the effect of shadowing is to create a disruption in the angular distribution of light incident on each point of reflective surface 92 of second optical element 90. Using conventional optical modeling methods known to one of ordinary skill in the optical arts, it is possible to integrate the effect of shadowing across the entire reflective surface 92 of second optical element 90. FIG. 9 represents the integral effect of shadowing across the entire reflective surface 92 of second optical element 90. Assuming light propagates through the fiber within an angular distribution extending from −β to β, first optical element completely shadows light within the angular range extending from 0 degrees (e.g. parallel to the axis of propagation) to α degrees. Light within the angular range extending from −α to 0 degrees and from α degrees to 2α degrees is partially shadowed by first optical element 80. By contrast, light within the angular range extending from −β to −α and from 2α to β is not shadowed by first optical element 80.

The disruption in the angular distribution of light reflected by second optical element 90 creates a corresponding angular variation in the spatial intensity of the light reflected from optical fiber 70. This variation results in a 'void' or 'hole' in the emerging angular distribution of light reflected from the fiber. This 'void' or 'hole' may be apparent to the naked eye of an observer viewing the optical fiber at a position within 'void' or 'hole'. It may be manifested as a region of relatively low intensity light or, in some circumstances, as a region substantially devoid of light.

Accordingly, another aspect of the present invention relates to defining a preferred range of angles for the reflective surface of optical elements to compensate for shadowing effects in an optical fiber. In this regard, the invention provides an optical fiber comprising a core material having a first surface for receiving light from a light source and an optically reflective surface for propagating light through the core material. The optically reflective surface includes a plurality of optical elements. Each optical element includes a reflective surface disposed at an angle θ with a plane perpendicular to the axis of propagation optical fiber, the angle θ being selected from a preferred range of angles to compensate for the disruption in the angular distribution of light incident on the reflective surfaces of the optical elements caused by shadowing.

By way of background, the notch angle, θ, may be derived from a desired angle, γ, from which optical fiber 70 is to be viewed. Assuming the medium surrounding the optical fiber core is air (refractive index=1.0), the a light ray reflected from reflective surface 78 must intersect the fiber/air interface at an exit angle, γ', determined by Snell's law as follows:

$$Sin(\gamma') = Sin \frac{\gamma}{\eta'}$$

where η' is the refractive index of the optical fiber core material. One of ordinary skill in the optical arts will appreciate that additional iterations of same procedure may be utilized to calculate the desired exit angle γ' if optical fiber 70 includes a cladding material(s) of different refractive indices. The angles γ and γ' are, by convention, measured form an axis normal to reflective surface 78 of optical fiber 70.

Applying principles of geometric optics known to one of ordinary skill in the optical arts, the angle θ necessary to reflect light from reflective surface 92 of second optical element 90 such that it intersects the reflective surface 78 of optical fiber 70 at angle γ' may be derived using the equation:

$$\theta = \frac{90 + \gamma'}{2}$$

By way of example, assuming that the desired exit angle is 0°, such that of the emerging angular distribution light exits optical fiber 70 centered about an axis substantially perpendicular to reflective surface 78, the above equation results in an angle θ of 45°.

According to the present invention the angle θ is modified to compensate for shadowing effects by adding a term ξ. Thus, according to the present invention, the angle θ is calculated as follows:

$$\theta = \frac{90 + \gamma'}{2} + \xi$$

The term ξ represents an angular deviation calculated to alter the exit angle about which the emerging angular distribution of light energy leaving the fiber is centered. Preferably, the angle θ is modified such that the broader lobe of the emerging angular distribution of light energy is centered about the desired exit angle, γ'. Thus, in a preferred embodiment, the error term ξ may be calculated from the equation:

$$\xi = \frac{\alpha + \beta}{4}$$

where:
α=the shadowing angle, as defined above, and
β=the cone angle of light propagating through the optical fiber.

By way of example, assuming again that the desired exit angle γ' is 90°, the shadowing angle measures 5° and the cone angle β of light propagating through optical fiber 70 measures 25 degrees, the preferred notch angle may be determined as follows:

$$\theta = \frac{90 + \gamma'}{2} + \xi$$

$$\theta = \frac{90 + \gamma'}{2} + \frac{\alpha + \beta}{4}$$

$$\theta = \frac{90 + 0}{2} + \frac{5 + 25}{4}$$

$$\theta = 52.5°$$

Thus, according to the present invention, the angle θ at which the reflective surfaces 92 of optical elements 90 are disposed is modified from the angle at which geometric optics teaches is required to reflect light from the fiber at a given exit angle, γ'. In a preferred embodiment, the angle θ is modified by a term ξ calculated to center the broader lobe of light about the desired exit angle γ', using the equation given above. However, for many applications it may be acceptable to center the emerging angular distribution of light energy around any angle ranging from −β to −α or from 2α to β. Thus, the term ξ may be selected from the group of angles ranging from α/z to β/z or from −β/z to −α.

EXAMPLE

A specific embodiment of the an optical fiber according to the present invention provides an optical waveguide and an illumination system particularly adapted for use in a Center High Mount Stop Light (CHMSL) in an motor vehicle. Photometric specifications for CHMSLs are set forth in the standard SAE J186 DEC89 set forth by the Society of Automotive Engineers. An optical fiber substantially as depicted in FIGS. 2–5 was manufactured. The optical fiber measured 500 millimeters in length and 9.5 millimeters in diameter. The optical fiber included two rows of optical elements: a first row disposed about a first longitudinal axis and a second row disposed about a second longitudinal axis angularly displaced from the first longitudinal axis by 10°. Each row included 189 optical elements that extend to a depth of approximately 0.25 millimeters (250 microns) into the optical fiber core. The spacing between the notches was calculated to uniformly extract optical power from the optical fiber using the following equation:

$$Sn = S1 \left( \frac{a^{n-1} + a^{N-n}}{1 + a^{N-1}} \right)$$

where:
$S_n$=the distance between optical element n and optical element n+1
$S_1$=the distance between optical element 1 to optical element 2,
n=the sequential number of the optical element,
N=the total number of optical elements (378), and
a=the coefficient of transmission for each notch (0.993).

The reflective surfaces of the notches were coated with a reflective silver substance. The reflective surfaces of the notches were disposed at an angle θ of 52.5°. A light-emitting diode was optically coupled to each end surface of the optical fiber and light was injected into the fiber. Suitable light emitting diodes include, for example, model HTWP-MH00 Light Emitting Diodes commercially available from the Hewlett-Packard Corporation.

The emerging light distribution was visually inspected. The illumination system exhibited substantially even illumination along the longitudinal extent of the optical fiber. Additionally, the illumination system exhibited substantially even illumination in a cross-fiber dimension.

The above discussion and example have disclosed several embodiments of an illumination system that includes an optical fiber having a core and a plurality of optical elements for extracting light from the core disposed about two distinct longitudinal axes. Although multiple embodiments of the present invention have been illustrated and described, it will be appreciated by those of ordinary skill in the optics arts that insubstantial changes calculated to achieve the same result may be substituted for the specific embodiments and steps disclosed above. This application is intended to cover any such adaptations or variations of the present invention. Therefore, it is intended that this invention be limited only by the appended claims and equivalents thereof.

What is claimed is:

1. An illumination system, comprising:
    an optical fiber including an optical fiber core having an optically smooth surface for propagating light through the fiber and a light emitting region extending along a portion of the fiber, the light emitting region including:
        a first plurality of optical elements centered about a first longitudinal axis extending along the optically smooth surface of the optical fiber core, each optical element including an optically reflective surface extending into the optical fiber core; and
        a second plurality of optical elements centered about a second longitudinal axis extending along the optically smooth surface of the optical fiber core, each element including an optically reflective surface extending into the optical fiber core, the second longitudinal axis displaced from the first longitudinal axis.

2. An illumination system according to claim 1, wherein: the second longitudinal axis is angularly displaced from the first longitudinal axis by an angle measuring between 1° and 180°.

3. An illumination system according to claim 1, wherein: the second longitudinal axis is angularly displaced from the first longitudinal axis by an angle measuring between 5° and 100°.

4. An illumination system according to claim 1, wherein: the second longitudinal axis is angularly displaced from the first longitudinal axis by an angle measuring between 5° and 20°.

5. An illumination system according to claim 1, wherein: the second longitudinal axis is angularly displaced from the first longitudinal axis by an angle measuring 10°.

6. An illumination system according to claim 1 wherein the light emitting region comprises:
    a plurality of optical elements centered about a third longitudinal axis extending along the optically smooth surface of the optical fiber core and including an optically reflective surface extending into the optical fiber core, the third longitudinal axis being angularly displaced from the first longitudinal axis and the second longitudinal axis.

7. An illumination system according to claim 1, further comprising:
    a light source optically coupled to the optical fiber.

8. An illumination system according to claim 1, wherein: the optical fiber has a cross-sectional shape selected from the group of cross-sectional shapes consisting of circular, elliptical, oval, rectangular, square, and polygonal.

9. An optical waveguide adapted to reduce visible variations in the angular intensity of light reflected from the waveguide in a viewing region centered about an axis disposed at a desired viewing angle, γ, comprising:
    a core formed from a substantially optically transparent material having a first surface adapted for receiving light from a light source and at least one optically smooth surface for propagating light through the waveguide along an axis of propagation, the optical surface comprising a plurality of optical elements, each optical elements having at least one optically reflective surface disposed at an oblique angle θ to a plane perpendicular to the axis of propagation; the angle θ being determined by the equation:

$$\frac{90 + \gamma'}{2} + \xi$$

wherein ξ is selected from the group of angles extending from (α/2) to (β/2) or (−β/2) to (−α) and wherein
α=the shadowing angle
β=the cone angle of light propagating through the optical fiber; and
γ'=the desired exit angle of reflected light.

10. An optical waveguide according to claim 9, wherein:

$$\xi = \frac{\alpha + \beta}{4} .$$

11. An optical fiber illumination system adapted for use as an automobile warning light, comprising:
    an optical fiber having opposing first and second surfaces adapted for receiving light from a light source and a reflective surface for propagating light through the fiber along an axis of propagation, the optical fiber having a length of approximately 500 millimeters and a diameter of approximately 9.5 millimeters;
    a plurality of optical elements centered about a first longitudinal axis extending along the surface of the optical fiber, each optical element having a first reflective surface and a second reflective surface that extend into the fiber to a depth of 0.25 millimeters;
    a plurality of optical elements centered about a second longitudinal axis extending along the surface of the optical fiber, each optical element having a first reflective surface and a second reflective surface that extend into the fiber to a depth of 0.25 millimeters;
    the first longitudinal axis being angularly displaced from the second longitudinal axis by 10°.

12. An optical fiber illumination system according to claim 11, wherein:
    each optical element comprises a first optically reflective surface extending into the core of the optical fiber and disposed at an angle of approximately 52.5° relative to an axis perpendicular to the axis of propagation.

13. An optical fiber illumination system according to claim 12, wherein:
    each optical element further comprises a second optically reflective surface extending into the core of the optical fiber and disposed at an angle of approximately 52.5° relative to an axis perpendicular to the axis of propagation, the first and second optically reflective surfaces intersecting along a linear groove base.

14. The illumination system of claim 1, wherein a spacing between the optical elements is between 0.05 and 5.0 millimeters.

15. The illumination system of claim 14, wherein optical elements in the first plurality of optical elements are substantially identical in size and geometry to optical elements in the second plurality of optical elements.

16. The illumination system of claim 14, wherein the first and second plurality of optical elements have a size and geometry such that the displacement between the first and second longitudinal axis is sufficient to reduce shadowing effects between elements in the first plurality of optical elements and elements in the second plurality of optical elements.

17. The illumination system of claim 14, wherein the optical elements are interspersed along the waveguide in an alternating pattern of one optical element from the first plurality of optical elements followed by one optical element from the second plurality of optical elements.

18. An optical waveguide having an axis and having a core formed from a substantially optically transparent material, the core having a perimeter and comprising:

a first surface adapted to receive light from a light source; and a light emitting region including a plurality of optical elements disposed on one side of the perimeter and an optically smooth surface on an opposed side of the perimeter, each optical element including a reflective surface extending into the core;

wherein the optical elements are arranged along the waveguide axis in a first and second overlapping sequence that are displaced relative to each other in a lateral direction perpendicular to the waveguide axis to enhance the angular spread in the lateral direction of light energy emitted from the optically smooth surface.

19. The waveguide of claim 18, wherein the plurality of optical elements are arranged along the waveguide axis in an alternating fashion between the first and second overlapping sequence.

20. The waveguide of claim 18, wherein the plurality of optical elements are spaced along the waveguide axis by between 0.05 and 5.0 millimeters.

21. The waveguide of claim 20, wherein the displacement between the first and second overlapping sequence reduces shadowing effects between optical elements.

22. The waveguide of claim 20, wherein the plurality of optical elements are substantially identical in size and geometry.

23. The waveguide of claim 20, wherein, when viewed along the waveguide axis, the optical elements in the first overlapping sequence subtend a first portion of the perimeter and the optical elements in the second overlapping sequence subtend a second portion of the perimeter, and wherein the first and second portions of the perimeter overlap.

* * * * *

UNITED STATES PATENT AND TRADEMARK OFFICE
CERTIFICATE OF CORRECTION

PATENT NO.     : 5,845,038
DATED          : December 1, 1998
INVENTOR(S)    : David Jon Lundin and Michael C. Lea It is certified that error appears in the above-identified patent and that said Letters Patent is hereby corrected as shown below:

<u>Title page,</u>
Item [75], after "Harlow" insert -- Essex --.

<u>Drawings,</u>
Insert -- 86 -- under "80".

<u>Column 8,</u>
Line 50, "Powerhouse ™" should read -- Powerhouse (TM) --.

Signed and Sealed this

Eighth Day of July, 2003

JAMES E. ROGAN
*Director of the United States Patent and Trademark Office*